United States Patent
Maier et al.

(10) Patent No.: US 7,829,234 B2
(45) Date of Patent: Nov. 9, 2010

(54) NON-LINEAR CATHODE INLET/OUTLET HUMIDITY CONTROL

(75) Inventors: Oliver Maier, Worms (DE); Peter Willimowski, Darmstadt (DE)

(73) Assignee: GM Global Technology Operations, Inc., Detroit, MI (US)

( * ) Notice: Subject to any disclaimer, the term of this patent is extended or adjusted under 35 U.S.C. 154(b) by 1261 days.

(21) Appl. No.: 11/304,332

(22) Filed: Dec. 15, 2005

(65) Prior Publication Data

US 2007/0138309 A1 Jun. 21, 2007

(51) Int. Cl.
H01M 8/02 (2006.01)
H01M 8/00 (2006.01)
(52) U.S. Cl. .................. 429/444; 429/428; 429/443
(58) Field of Classification Search .................. None
See application file for complete search history.

(56) References Cited

U.S. PATENT DOCUMENTS

2003/0072980 A1* 4/2003 Formanski et al. ............ 429/13
2004/0185315 A1* 9/2004 Enjoji et al. .................. 429/22

* cited by examiner

Primary Examiner—Dah-Wei D Yuan
Assistant Examiner—Maria J Laios
(74) Attorney, Agent, or Firm—John A. Miller; Miller IP Group, PLC

(57) ABSTRACT

A technique for controlling the relative humidity of a cathode airflow to a fuel cell stack that includes compensating for valve non-linearities. The cathode input air flows through a water vapor transfer unit where it is humidified. The humidified cathode exhaust from the fuel cell stack is output to the water vapor transfer unit to provide the water vapor for humidifying the cathode input airflow. A first control valve controls the flow of the cathode exhaust through the water vapor transfer unit and a second control valve controls the flow of the cathode exhaust that by-passes the water vapor transfer unit to control both the relative humidity of the cathode input airflow and the pressure within the stack. By compensating for the non-linearity, the first and second valves control the relative humidity of the cathode airflow without changing the cathode output resistance.

13 Claims, 4 Drawing Sheets

NON-LINEAR CATHODE INLET/OUTLET HUMIDITY CONTROL

BACKGROUND OF THE INVENTION

1. Field of the Invention

This invention relates generally to a technique for controlling the relative humidity of a cathode input airflow to a fuel cell stack and, more particularly, to a technique for controlling the relative humidity of a cathode input airflow to a fuel cell stack that includes controlling valves at the cathode output of the stack in a non-linear manner so that a portion of the cathode exhaust can be selectively directed through a water vapor transfer unit without affecting the pressure of the stack.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For example, a typical fuel cell stack for a vehicle may have two hundred or more stacked fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The membranes within a fuel cell stack need to have a certain relative humidity so that the ionic resistance across the membrane is low enough to effectively conduct protons. If the wetness of the membranes is not at or near an optimum level, then the durability of the membranes is reduced. Therefore, to help maintain membrane relative humidity, it is known in the art to humidify the airflow to the cathode side of the stack.

As mentioned above, water is generated as a by-product of the stack operation. Therefore, the cathode exhaust from the stack will include water vapor and liquid water. It is known in the art to use a water vapor transfer (WVT) unit to capture some of the water in the cathode exhaust, and use the separated water to humidify the cathode airflow.

FIG. 1 is a schematic diagram of a fuel cell system 10 that humidifies a cathode input airflow to a fuel cell stack 12 in this manner. A compressor 14 provides a compressed airflow on line 16 to the cathode side of the stack 12. A humidified cathode exhaust gas is provided on line 18 at the output of the cathode side of the stack 12. The airflow from the compressor 14 on the line 16 is directed through one side of a WVT unit 20 and the cathode exhaust gas on the line 18 is directed through another side of the WVT unit 20. The WVT unit 20 includes permeation membranes, or other porous materials, as is well understood in the art, that collects water vapor and liquid water in the cathode exhaust gas and uses this water to humidify the airflow to the cathode input.

The relative humidity of the cathode input airflow and the pressure within the fuel cell stack 12 need to be tightly controlled for proper fuel cell stack operation. The mass flow of the water transferred through the WVT unit 20 depends on the partial pressure of the water, the flow of air through the WVT unit 20 and other system parameters. To control the relative humidity and pressure, proportional control valves 22 and 24 are selectively opened and closed to direct the cathode exhaust gas through the WVT unit 20 or by-pass the WVT unit 20 on a by-pass line 26. A dew-point sensor 28, or other suitable sensor, measures the relative humidity of the cathode airflow after the WVT unit 20, and that value in combination with the stack operating conditions, such as current density, temperature, pressure, etc., determines the position of the control valves 22 and 24 so that the proper relative humidity is provided for the cathode input air. A pressure sensor 30 measures the pressure in the line 16 at the cathode inlet to the stack 12.

In one embodiment, the proportional control valves 22 and 24 are butterfly valves, well known to those skilled in the art. FIG. 2 is a cross-sectional view of a butterfly valve 32 that can be used for the control valves 22 and 24. The butterfly valve 32 includes a rotatable valve plate 34 that selectively opens and closes a flow path 36 to provide the flow control.

The control valves 22 and 24 control the humidity of the cathode input airflow and the cathode stack pressure. If the controller of the fuel cell system 10 wants to change the pressure and maintain a certain relative humidity, or change the relative humidity and maintain the pressure, separate humidity and pressure controllers are used to control the valves 22 and 24. FIG. 3 is a graph with controller output percentage on the horizontal axis and plate angle on the vertical axis showing the relationship between the angle of the valve plates for the valves 22 and 24 to provide relative humidity control. The known algorithms used for relative humidity control maintain the orientation of the valve plate for the control valve 24 on line 40 and the orientation of the valve plate for the control valve 22 on line 42 so that when the plate angles are added they will equal 90°. Therefore, the sum of the angle of the two plates for the valves 22 and 24 is constant.

FIG. 3 shows that there is a linear relationship between the opening and closing of the valve plates of the valves 22 and 24. However, the opening and closing of the valve plates is actually non-linear. What this means is that if there is a displacement to change the flow distribution through the valves 22 and 24, the total resistance provided by the valves 22 and 24 will change because of the non-linear characteristics of the valves 22 and 24 (see FIG. 4), which will cause the pressure in the stack 12 to change. Therefore, the pressure controller will have to adjust the position of the plate for the valve 22 to correct the change in the system pressure. Thus, the pressure controller influences the humidity controller, which could cause system instability.

SUMMARY OF THE INVENTION

In accordance with the teachings of the present invention, a technique for controlling the relative humidity of a cathode airflow to a fuel cell stack is disclosed that includes compensating for valve non-linearities. The cathode input air flows through a water vapor transfer unit where it is humidified. The humidified cathode exhaust from the fuel cell stack is output to the water vapor transfer unit to provide the water vapor for humidifying the cathode input airflow. A first control valve controls the flow of the cathode exhaust through the water vapor transfer unit and a second control valve controls the flow of the cathode exhaust that by-passes the water vapor transfer unit to control both the relative humidity of the cathode input airflow and the pressure within the stack.

A pressure controller provides a valve offset signal based on the difference between a measured stack pressure and a required stack pressure. A relative humidity controller provides a valve resistance signal based on the difference between the relative humidity of the cathode airflow and the required relative humidity of the cathode airflow. The difference between the valve resistance signal and a maximum valve resistance value are sent to a look-up table that maps valve position non-linearity and provides a valve position signal for the first control valve. The valve resistance signal is also provided to the look-up table to provide a valve position signal that is added to the valve offset signal to provide a valve position signal for the second valve. By compensating for the valve non-linearity, the control algorithm of the invention allows the first and second valves to control the relative humidity of the cathode airflow without changing the cathode output resistance, which would otherwise change the pressure in the stack.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an algorithm for controlling the relative humidity of the cathode input airflow to a fuel cell stack is merely exemplary in nature, and is in no way intended to limit the invention or its applications or uses.

As will be discussed in detail below, the present invention compensates for the non-linearity of the resistance to the valve plate position of the control valves 22 and 24 so that the amount of cathode exhaust gas sent through the WVT unit 20 can be changed to change the relative humidity of the cathode input airflow without changing the cathode output resistance, which could change the pressure in the stack 12. Therefore, the pressure controller that controls the system pressure can be decoupled from the relative humidity controller that controls the relative humidity of the cathode input airflow.

Figure 1:
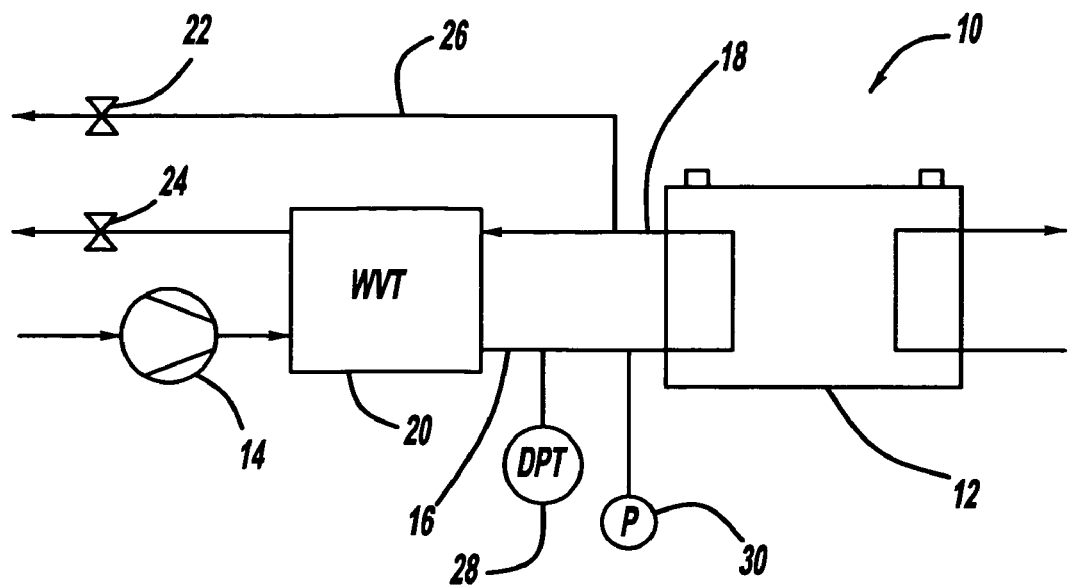
FIG. 1 is a schematic diagram of a fuel cell system including a water vapor transfer unit for humidifying a cathode input airflow.
Figure 2:
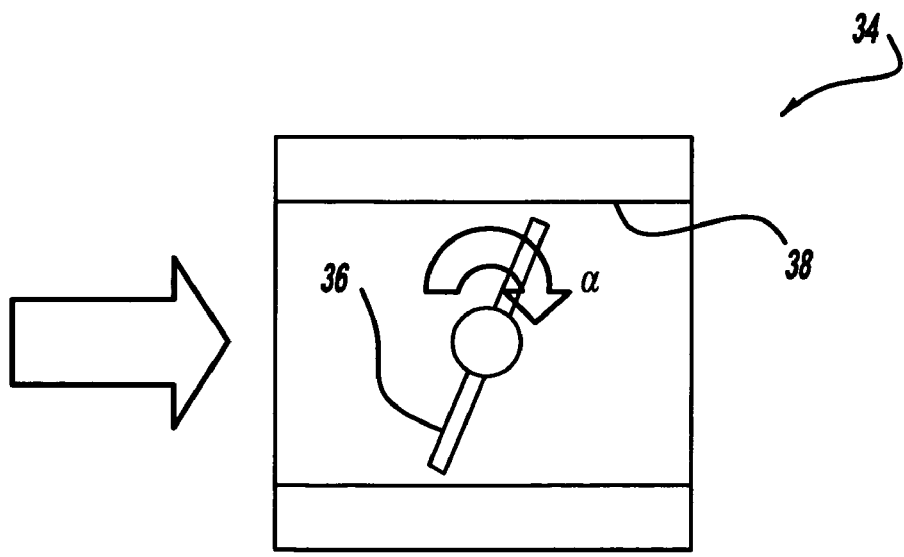
FIG. 2 is a cross-sectional view of a butterfly control valve used in the system shown in FIG. 1.
Figure 3:
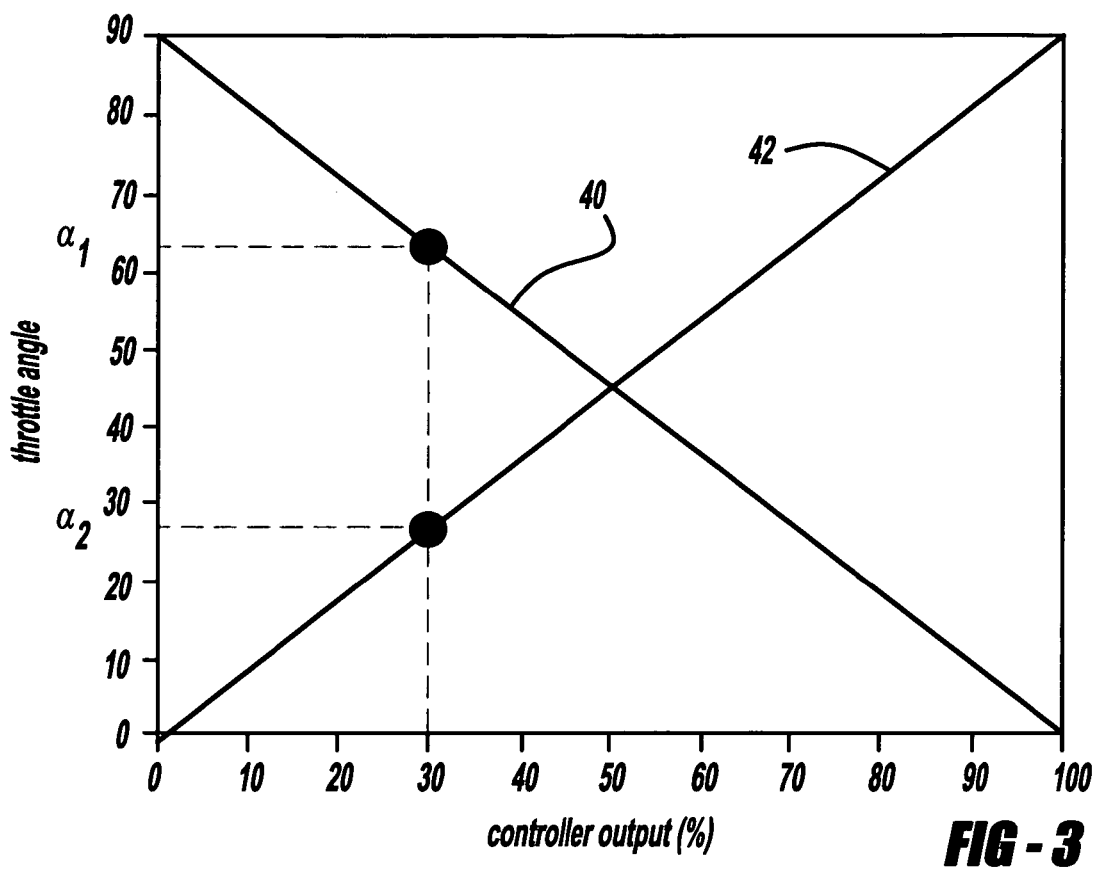
FIG. 3 is a graph with controller output percentage on the horizontal axis and valve plate angle on the vertical axis showing the linear intersection between the angle of the valve plates of the control valves in the system shown in FIG. 1.
Figure 4:
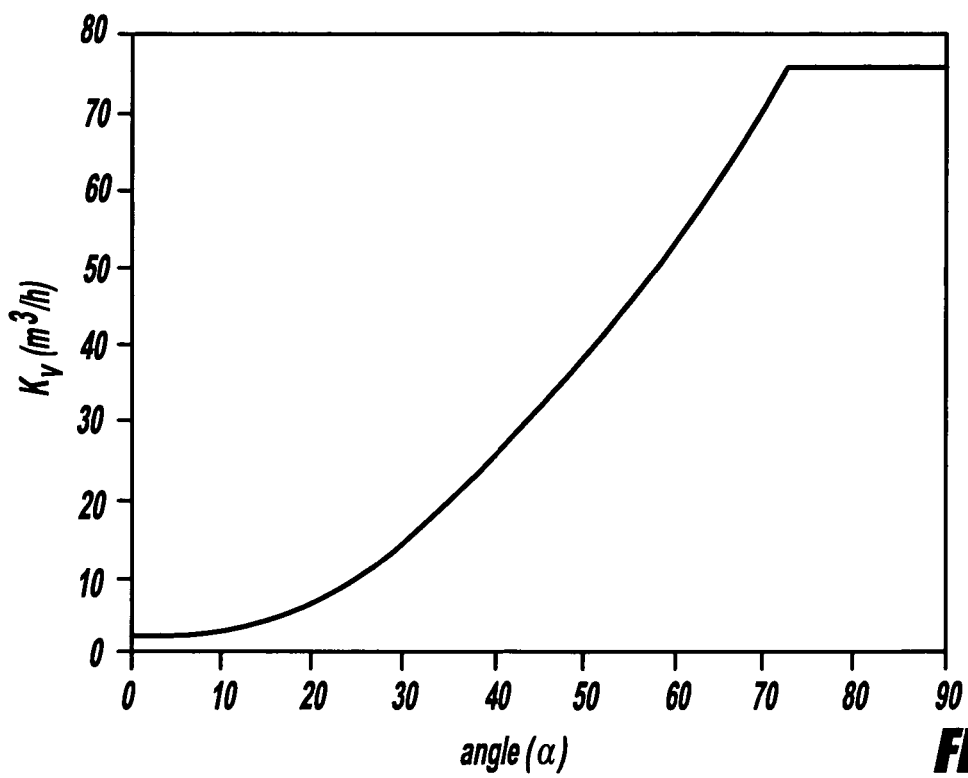
FIG. 4 is a graph with valve plate angle on the horizontal axis and pressure resistance on the vertical axis showing that the relationship between valve resistance and valve plate angle is non-linear.

FIG. 4 is a graph with the angle of the valve plate 32 on the horizontal axis and the resistance of the airflow through the valve 30 on the vertical axis that shows that the resistance of the flow through the valves 22 and 24 is non-linear relative to the angle of the valve plate. A pressure resistance value $K_v$ describes the flow resistance of the butterfly valve 30 and is related to the diameter of the valve plate 32 and the angle $\alpha$ of the valve plate 32. According the invention, when the relative humidity of the cathode airflow is changed by opening or closing the valve 24 so that more or less of the cathode exhaust goes through the WVT unit 20, the valve 22 is also opened or closed so that the cathode pressure stays the same. Therefore, the flow distribution through the valves 20 and 24 can be controlled by a relative humidity controller without using a pressure controller because the resulting resistance value $K_v$ for the combined valves 20 and 24 will not change.

The equations for the flow calculation through the valves 22 and 24 at a given pressure difference are provided in equations (1) and (2) below, where equation (1) is for sub-critical conditions and equation (2) is for over-critical conditions.

$$Q = 1{,}0219 * K_v^* \sqrt{\frac{\rho_n^*(p_1^2 - p_2^2)}{T}} \tag{1}$$

$$Q = 0{,}8807 * K_v^* \sqrt{\frac{\rho_n^* p_1^2}{T}} \tag{2}$$

Where $\rho_n$ is the density of the gas under normal conditions in kg/m$^3$, T is the temperature in Kelvin, Q is the mass flow rate in g/s, $p_1$ is the valve inlet pressure in kPa, $p_2$ is the valve outlet pressure in kPa and $K_{84}$ is the pressure resistance value in m$^3$/h.

In order to meet the desired relative humidity set-point, the relative humidity controller has to change the flow distribution through the WVT unit 20 using the valve 24 by commanding the pressure resistance value $K_v$. Thus, the resistance value $K_v$ has a non-linear relationship to the valve position/angle. The pressure resistance value $K_v$ can be stored in a look-up table relative to the valve position. The resistance value $K_v$ for the valve 24 is the absolute value difference of the humidity controller resistance value $K_v$ minus a maximum resistance value $K_{v\_max}$. This means that the sum of the resistance values $K_v$ for both of the valves 22 and 24 is always constant. The resistance values $K_v$ are the inputs to a look-up table, which calculates the valve position. If a higher pressure is required, the valve 22 is closed by the pressure controller so that the total sum of the resistance values $K_v$ decreases. Therefore, the relative humidity of the cathode inlet airflow can be controlled without influencing the system pressure.

Figure 5:
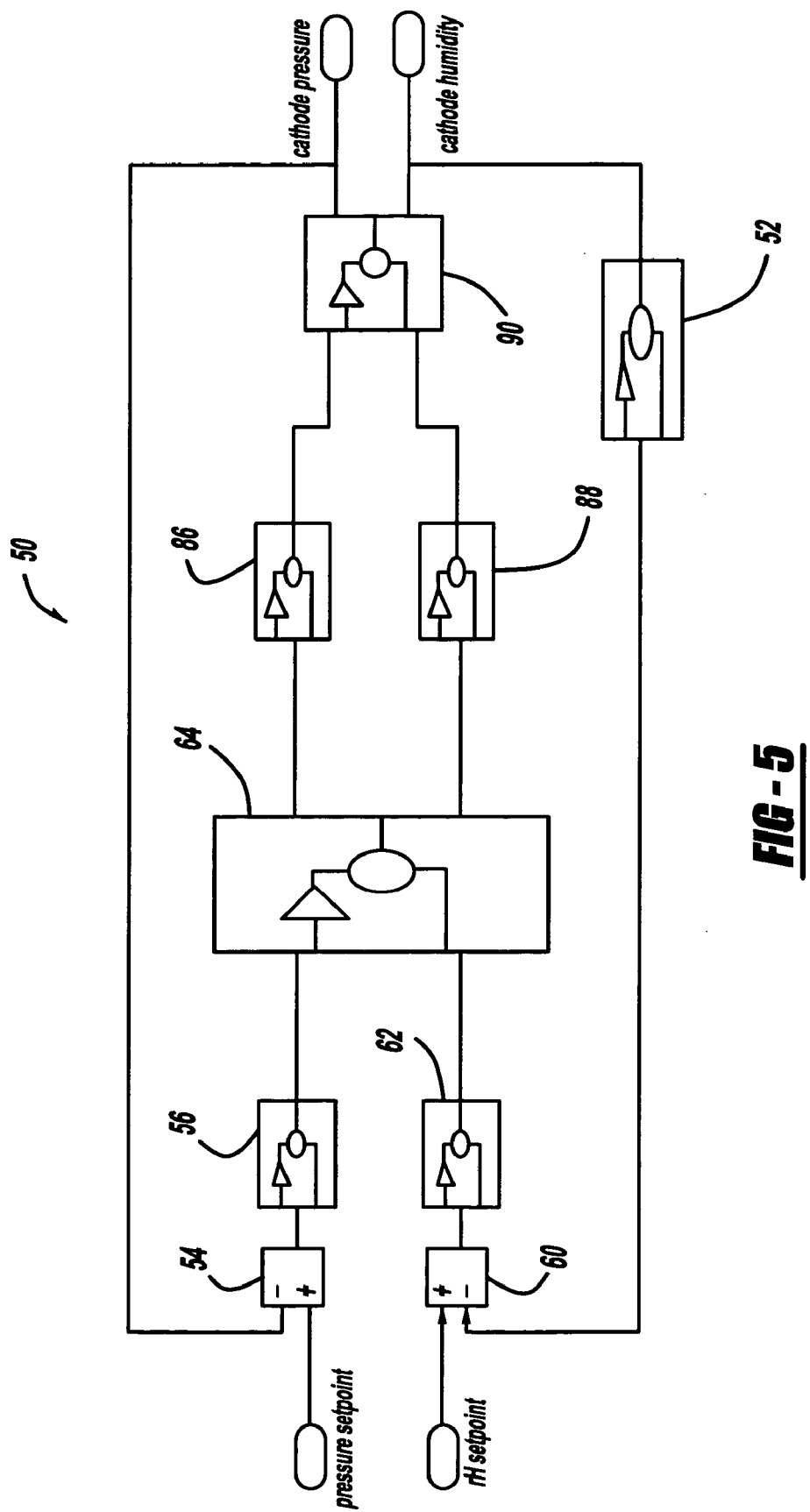
FIG. 5 is a block diagram of a control structure for controlling the valves in the system of FIG. 1.

FIG. 5 is a block diagram of a control system 50 that controls the valves 22 and 24. A measured cathode pressure signal from a pressure sensor, such as the pressure sensor 30, and a required pressure set-point signal are applied to a comparator 54 that generates a pressure difference signal between the required pressure and the measured pressure. The pressure difference signal is sent to a pressure controller 56 that generates a valve plate offset value that sets the position of the valve plate in the valve 22. Pressure controllers that are used for this purpose are well known to those skilled in the art.

A measured relative humidity value from a dew-point sensor 52, representing the dew-point sensor 28, and a required relative humidity set-point are applied to a comparator 60 that generates a relative humidity difference signal between the required relative humidity and the measured relative humidity. The relative humidity difference signal is sent to a relative humidity controller 62 that generates a resistance value $K_v$. Relative humidity controllers that are used for this purpose are also well known to those skilled in the art. In an alternate embodiment, the relative humidity can be estimated by a suitable algorithm instead of measured.

Figure 6:
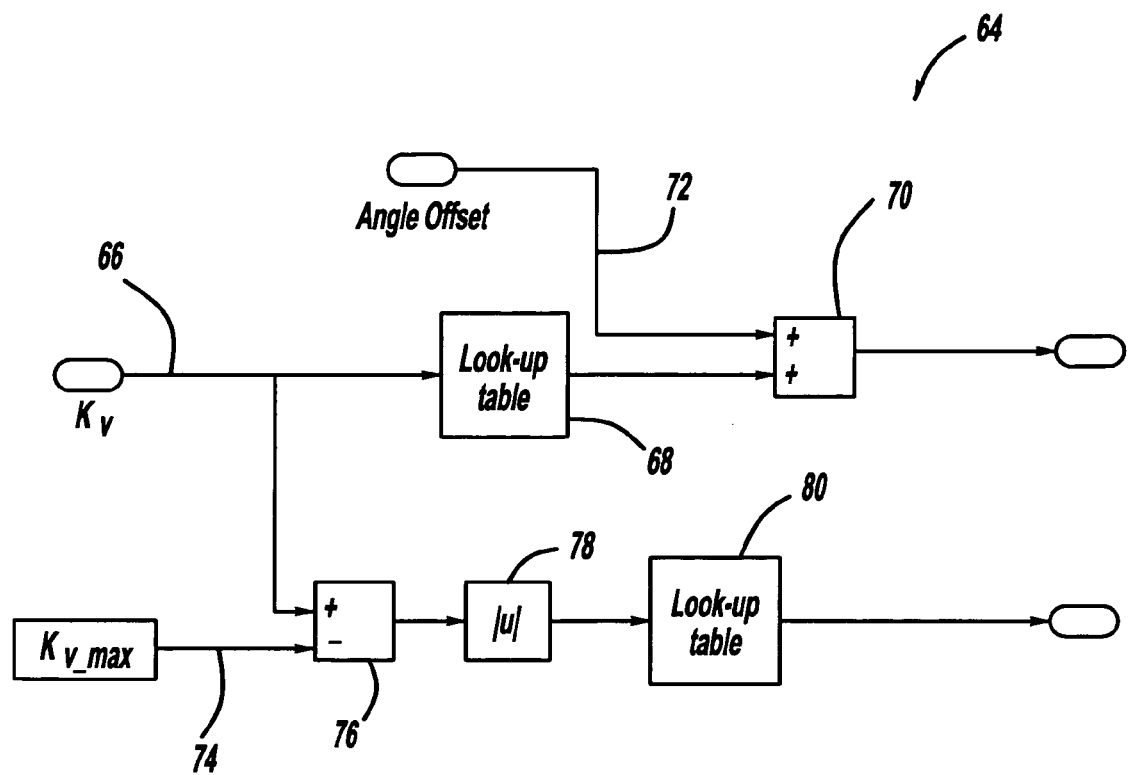
FIG. 6 is a block diagram of an intersection processor shown in the control structure in FIG. 5 to provide the valve plate positions.

The offset value and the resistance value are sent to an intersection processor 64, shown in more detail in FIG. 6. The resistance value $K_v$ on line 66 is sent to a look-up table 68. The look-up table 68 is a map that provides a valve plate angle value based on the resistance value $K_v$, for the non-linear relationship between the plate angle and the resistance value $K_v$, shown in FIG. 4. The valve plate angle value from the look-up table 68 is sent to an adder 70 to be added with the offset value on line 72 from the pressure controller 56. The output of the adder 70 is the signal that controls the position of the valve plate of the valve 22.

The resistance value $K_v$ on the line 66 and the maximum resistance value $K_{v\_max}$ on line 74 are sent to a comparator 76. The maximum resistance value $K_{v\_max}$ is the resistance value when the valve plate is completely closed, where some flow would still be provided. The output of the comparator 76 is a difference value between the maximum resistance value $K_{v\_max}$ and the resistance value $K_v$, and is sent to an absolute value processor 78 to make sure the difference is a positive value. The difference value is sent to a look-up table 80 that is the same as the look-up table 68 and provides a plate angle signal based on the relationship shown in FIG. 4 for the position of the valve plate in the valve 24. Therefore, if the system 50 corrects the relative humidity of the cathode airflow, the position of both valves 22 and 24 will be changed, and if the system 50 corrects the pressure, only the position of the valve 22 is changed. Thus, the humidity control is decoupled from the pressure control because the pressure will not change in response to a relative humidity correction.

Returning to FIG. 5, the valve plate position signal from the adder 70 is sent to a valve 86 representing the valve 22 and the valve plate position signal from the look-up table 80 is sent to a valve 88 representing the valve 24. The valves 86 and 88 are part of a cathode plant 90 that depicts the operation of the cathode side of the fuel cell stack 12.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for controlling the relative humidity of a cathode airflow to a fuel cell stack, said system comprising:
    a water vapor transfer unit for humidifying the cathode airflow, said water vapor transfer unit receiving a cathode exhaust gas on a cathode exhaust gas line where the water vapor in the cathode exhaust gas provides the humidity for the cathode airflow;
    a first control valve positioned in the cathode exhaust gas line for controlling the flow of the cathode exhaust gas through the water vapor transfer unit to control the relative humidity of the cathode airflow;
    a second control valve positioned in a by-pass line for controlling the flow of the cathode exhaust gas by-passing the water vapor transfer unit; and
    a controller configured to control the position of the first and second control valves, said controller compensating for the non-linearity between the flow resistance and the valve position of the first and second control valves by changing the position of both the first and second control valves when changing the relative humidity of the cathode airflow so that the combined flow resistance of the first and second control valves does not significantly change.

2. The system according to claim 1 wherein the first and second control valves are butterfly valves and wherein the controller controls the angle of a valve plate in the butterfly valves.

3. The system according to claim 1 wherein the controller includes a pressure control unit for controlling the pressure in the stack and a relative humidity control unit for controlling the relative humidity of the cathode airflow, wherein the pressure control unit and the relative humidity control unit are decoupled.

4. The system according to claim 3 wherein the pressure control unit generates a valve offset signal based on the difference between a measured cathode pressure and a required pressure set-point.

5. The system according to claim 4 further comprising a pressure sensor positioned in a cathode input line, said pressure sensor providing the measured cathode pressure.

6. The system according to claim 3 wherein the relative humidity control unit generates a valve resistance signal based on the difference between a measured cathode relative humidity and a required relative humidity set-point.

7. The system according to claim 6 further comprising a dew-point sensor positioned in a cathode input line, said dew-point sensor providing the measured cathode relative humidity.

8. A method for controlling the relative humidity of a cathode airflow to a fuel cell stack, said method comprising:
    sending the cathode airflow through a water vapor transfer unit for humidifying the cathode airflow;
    using a first control valve to control the flow of a cathode exhaust gas through the water vapor transfer unit to humidify the cathode airflow;
    using a second control valve to control the flow of a cathode exhaust gas that by-passes the water vapor transfer unit; and
    controlling the position of the first and second control valves when changing the relative humidity of the cathode airflow to compensate for the non-linearity between the flow resistance and the valve position of the first and second control valves so that the combined flow resistance of the first and second control valves does not significantly change.

9. The method according to claim 8 wherein the first and second control valves are butterfly valves and wherein the controlling the position of the first and second control valves includes controlling the angle of a valve plate in the butterfly valves.

10. The method according to claim 8 wherein controlling the position of the second control valve includes generating a valve offset signal based on the difference between a measured cathode pressure and a required pressure set-point.

11. The method according to claim 10 wherein controlling the position of the second control valve includes adding the valve offset signal to a mapped valve position value based on flow resistance and a valve position.

12. The method according to claim 8 wherein controlling the position of the first and second control valves includes generating a valve resistance signal based on the difference between a measured cathode humidity and a required relative humidity set-point.

13. The method according to claim 12 wherein controlling the position of the first and second control valves includes subtracting the valve resistance signal from a maximum valve resistance signal and mapping the subtracted value to provide a valve position value based on flow resistance and a valve position.

* * * * *